United States Patent [19]

Alexandrian et al.

[11] Patent Number: 4,945,674

[45] Date of Patent: Aug. 7, 1990

[54] APPLIANCE FOR TYING UP PLANTS

[76] Inventors: Karen V. Alexandrian, ulitsa Teriana, 59, kv. 20; Karen G. Melikian, ulitsa Atarbekiana, 57/19, kv. 87; Akam A. Alexanian, ulitsa Aboviana, 22, kv. 5; Kamo S. Saakian, Norashen Kvartal, 21, kv. 46; Levon Lachinian, ulitsa Tumaniana, 14, kv. 3; Oganes S. Gendzhoian, ulitsa Dodokhiana, 2, all of Erevan, U.S.S.R.

[21] Appl. No.: 477,308

[22] Filed: Feb. 8, 1990

[51] Int. Cl.$^5$ ............................................... A01G 17/06
[52] U.S. Cl. ..................................... 47/1.01; 156/468; 156/139.3; 156/591; 47/46
[58] Field of Search ............... 156/468, 475; 53/139.3, 53/553, 591; 47/46, 1.01

[56] References Cited

U.S. PATENT DOCUMENTS

| | | | |
|---|---|---|---|
| 2,638,714 | 5/1953 | Young | 47/46 |
| 4,182,096 | 1/1980 | Ballestzazzi et al. | 53/553 |
| 4,499,928 | 2/1985 | Furutsu | 156/468 X |
| 4,782,648 | 11/1988 | Van Ottela | 53/553 |
| 4,790,896 | 12/1988 | Schmalholtz | 156/468 X |

FOREIGN PATENT DOCUMENTS 1152547  2/1984  U.S.S.R. .

*Primary Examiner*—Henry E. Raduazo
*Assistant Examiner*—Linda J. Hoffert
*Attorney, Agent, or Firm*—Burgess, Ryan and Wayne

[57] ABSTRACT

A specific feature of the present invention resides in that it is provided with a device for a cyclic advance of the tape from a reel, made in the form of plates different in size and arranged in succession on the body and clamp, each of said plates is provided with a slot for passing the tape, the slots being arranged on the shorter plate at free ends thereof and on the longer plates, level with the slots arranged on the shorter plates.

3 Claims, 1 Drawing Sheet

APPLIANCE FOR TYING UP PLANTS

FIELD OF THE INVENTION

The invention relates to the farm machinery industry and, more particularly, to appliances for tying up plants to wire trellises or supports.

The appliance embodied, according to the present invention may be used for tying up various plants (grapevine, stems of vegetable and other hothouse crops, melon and berry crops) to the wire trellises or supports. The appliance may also be used for binding small-size goods.

DESCRIPTION OF THE PRIOR ART

Appliances of the similar application suffer from substantial complexity, metal content and working hours consumed by the manufacturing process.

Known appliance comprise complicated mechanisms for feeding, holding, cutting and fastening a tying material (tape). Plants are tied up to the trellis by loops of polymeric tapes, the loops being formed by cutting the tape ends and fastening them by means of additional elements (steel staples, tapes, thread, etc.).

The number of working hours may be cut down by reducing the labour expenditure for fastening the ends of tying loops by way of using electric heating tools for welding the ends of the loops and using thermowelding polymeric tapes as a tying material. However, and in this case the apparatus design involves the use of complicated tape feeding, holding and cutting units. Besides, after each tying operation a definite length of the tape is cut off and dropped in the field due to which approximately up to 35% of th tying material is lost in vain.

Known to the prior art is a number of appliances in which the tying loops are formed by welding with the aid of an electric heating tool. Such a desing embodiment of the tape fastening unit makes it possible to reduce the labour expenditure for fastening the ends of tying loops. However, the presence of the units for separation of the formed loop from the tape being unwound from a tape reel, as well as for the subsequent feeding of this tape and its holding in order to insure an overlapping of the appliance jaw by the tape leads to a substantial complication of the design, and increase of the metal content, difficulties is servicing, as well as contributes to an unproductive consumption of the tying material caused by its compelled losses at each tying operation which decreases the economic efficiency of the process.

Appliances which have no complicated mechanisms for cutting the tape by means of electric heating tools are more advantageous and promising from the economic standpoint.

Known is the prior art is an appliance which comprises two pivotally associated and spring-loaded halves. One of the halves mounts two tips of an electric heating tool projecting above the surface and the other half mounts the clamp. From the reel the tape is passed through a slot between the heating tool tips and is secured in the clamp (SU, A, 1,152,547). Such a design of the applicance makes it possible to form the tying loops at lesser labour expenditures at the expense of reducing the efforts applied to the cutting and welding of the loop ends which is done simultaneously. Besides, this appliance features a simple design due to the absence of various units for cutting, feeding and holding the tape after each tying operation.

However, the appliance described hereinabove has the following disadvantages which directly affect the quality of the plant tying-up process.

After the welding of the tape ends and formation of a tying loop the appliance jaw is instantly opened under the action of a compressed spring and in order to overlap the jaw the tape is unwound from the reel which offers a definite resistance to rotation. As a result, the quality of the weld seam is impaired or a still hot weld seam of the tape ends passing through the slots from the reel and from under the clamp is broken. Therefore, in the process of operation it becomes necessary to weld the ends of tapes once again or to secure a new end of the tape under the clamp which reduces the productivity and reliability of the tying-up process. To avoid this disadvantage, the appliance jaw may be opened more slowly in order to reduce the sluggishness of the reel and to increase the time for cooling of the weld seam which will simultaneously decrease the productivity of labour.

In addition, a piece of the tape one end of which is held under the clamp gets gradually shortened and deformed in the process of operation due to the fact that the welding and cutting operations are always performed at one and the same place. This in turn leads to deterioration of the welding conditions resulting in obtaining a weak weld seam which reduces the reliability of the tying-up. Therefore, it becomes necessary to periodically remove the above-mentioned piece of the tape and to insert under the clamp a new end of the tape passing from the reel which also decreases the productivity of labour.

It should also be noted that in the process of operation the heating tool tip projecting above the surface may be damaged by a plant to be tied up and a wire when they are brought in and out of the appliance jaw.

DISCLOSURE OF THE INVENTION

It is a main object of the invention to provide an appliance for tying up plants with an improved device for a cyclic advance of the tape from a reel.

It is another object of the invention to provide the formation of reliable tying loops.

It is still another object of the invention to provide economy in expenditure of the tying material.

These and other objects of the invention are attained by that in an appliance for tying up plants comprising a body with a welding tip and heating elements, and also a spring-loaded clamp pivotally secured to the body and provided with a gripping element, and a reel for a tape tying material, according to the invention, provision is made for a device for a cyclic advance of the tape accomplished in the form of plates different in size and arranged in succession on the body and the clamp, and each of the plates is provided with a slot for passing the tape, the slots being arranged on the shorter plates at free ends thereof and on the longer plates, level with the slots arranged on the shorter plates.

It is desirable that the reel be equidistant from the body welding tip and the clamp gripping element.

It is likewise desirable that the heating elements be contained in an enclosure spring-loaded in relation to the welding tip and provided with slots for passing the heating elements.

Such a design embodiment of the proposed appliance makes it possible to improve the reliability and productivity of the tying-up process.

The proposed invention resides in the following.

At a rapid opening of the appliance jaw when the body welding tip and the clamp gripping element are departing from each other, a still hot weld seam connecting both branches of the tapes running from a double-tape reel and passing out of the slots provided in the welding tip enclosure and in the clamp gripping element is broken due to resistance to rotation of the reel during unwinding of the tapes for overlapping the opening jaw of the appliance. To eliminate this disadvantage, use is made of a device for cyclic advance of the tape. When the body and clamp of the appliance are moved to each other the longer plates of this device press on the tapes and a definite lengths of tapes are unwound from the reel. Thus, a formed "zig-zag" of the tapes is used for overlapping the appliance jaw in the process of its opening. Freed from the pressure exerted by the longer plates this reserve of the tapes practically do not tension the weld seam which by the end of the appliance jaw opening has enough time for cooling down.

Performed investigations have prooved that the presence of this device on the appliance for tying up plants contributes to a 8- to 12-fold reduction of the tensile forces acting on the weld seam which makes it possible to rapidly open the appliance jaw without impairing the quality of weld seams and consequently of the tying loops. To insure normal functioning of the device, it is advantageous that the longer plates are arranged adjacently and the shorter ones, externally. Dimensions of the plates, the distance therebetween and the arrangement of slots thereon have a direct effect on the value of a formed reserve of tapes and depend upon a required width of the appliance jaw opening which for different agricultural crops is in a range of 30 to 50 mm.

It has been experimentally proved that in comparison with open heating elements the heating elements with a protective enclosure do not come in contact with a plant and wire, and hence avoid deformation and choking. In addition, they are subjected to effect of the environment (wind, dust) to a lesser degree which improves the thermal conditions and quality of welding. It is also important that before welding both branches of the tapes are at first forced by the surface of the enclosure against the clamp gripping element and are held in place, and only thereafter the heating elements pass out of the enclosure slots to weld and cut off the tapes. This improves the quality of weld seams on the loops by 1.5-2 times.

It should be noted tha the equidustant arrangement of the reel with the tape in relation to the body welding tip and the clamp gripping element, that is, its equidistant arrangement from the place of welding adds to the uniform unwinding of tapes. It has been proved that use of one reel with a double-tape winding is more preferable than use of two separate reels, as it simplifies the design and operation of the appliance which in turn provides a uniform consumption of both tapes.

Thus, the elements of the appliance working members due to the properties imparted thereto provide the conditions for forming the quality tying loops with a minimum expenditure of the time and labour, as well as without unproductive losses of the tying material.

BRIEF DESCRIPTION OF THE DRAWINGS

These features and other advantages of the present invention will become more apparent by reference to a specific embodiment thereof taken in conjunction with the accompanying drawings, wherein.

BEST MODES FOR CARRYING OUT THE INVENTION

Figure 1:
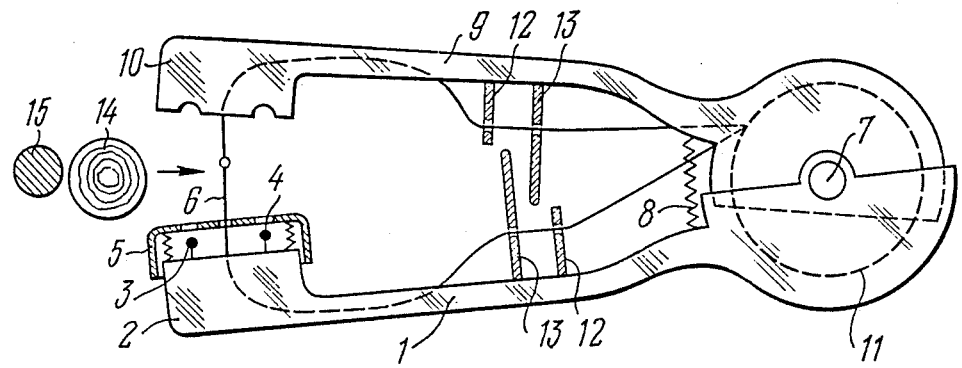
FIG. 1 illustrates a general view of the appliance for tying up plants, according to the invention.

An appliance for tying up plants (FIGS. 1-3) comprises a body 1 with a welding tip 2 which mounts heating elements 3 and 4, and also an enclosure 5 spring-loaded relative to the welding tip 2 and provided with slots for passing the heating elements 3, 4, and a slot provided therebetween for a tape 6; a clamp 9 secured with a pivot 7 to the body 1, loaded with a spring 8 and provided with a gripping element 10 having recesses; a reel 11 coaxial with the pivot 7 and provided with the tape 6 two branches of which are wound on the reel 11; a device for cyclic advance of the tape comprising plates 12 and 13 different in size and arranged in succession on the body 1 and the clap 9, and each of the plates is provided with a slot for passing the tape 6, the slots being arranged on the shorter plates 12 at free ends thereof, and on the longer plates 13, level with the slots arranged on the shorter plates 12.

For convenience in loading the appliance with the tape, the welding tip 2 and the gripping element 10 are provided with slots (not shown in the drawings) for passage of the tape. For economy of energy and for extending the service life of a power supply source (storage battery, solar battery, dry cells, a.c.mains), the heating elements 3 and 4 function in an intermitttent mode for which purpose a push-button switch (not shown in the drawings) controlling the functioning of the heating elements 3 and 4 is provided between the body 1 and the clamp 9 near the spring 8.

Though the invention has been described herein in connection with the preferred embodiment thereof, it is to be understood that variations and modifications may be made without departing from the spirit and the scope of the invention.

The process of tying up plants by means of the appliance is accomplished in the following manner.

Before operation two tapes of equal length should be simultaneously wound on the reel 11, the appliance should be opened and the reel should be installed thereinto. Thereafter, both ends of the tapes 6 are passed through the slots in the plates 12 and 13, and further are brought outside through the slots in the welding tip 2 and the gripping element 10; in addition to the slot of the welding tip, the lower tape is also passed through the slot in the enclosure 5. Further, the appliance is closed, connected to a power supply source and the ends of the tapes are brought out of the appliance jaw. By simultaneously pressing on the body 1 and the clamp 9 the ends of the tapes are welded due to which the distance between the welding tip 2 and the gripping element 10 is overlapped by the tapes 6, and the appliance is considered to be ready for operation (FIG. 1).

By its jaw overlapped with the tape, the appliance is moved onto a plant 14 and a wire trellis 15. The latter surrounded by the tape are brought in the space between the body 1 and the clamp 9, and a required reserve of the tape is uniformly unwound from the reel 11.

Figure 2:
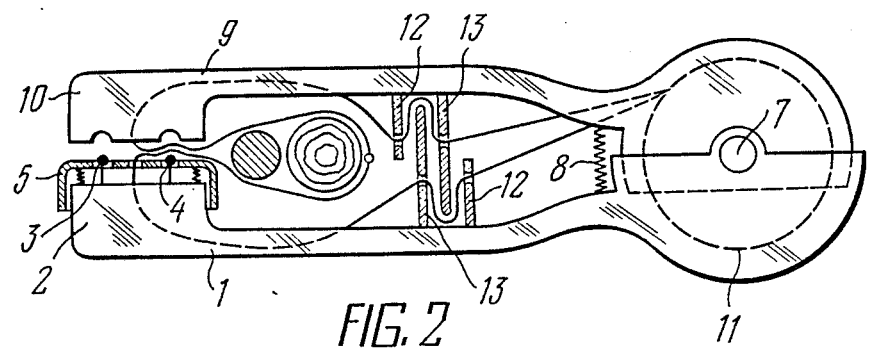
FIGS. 2 and 3 are views like FIG. 1 illustrating various stages of the appliance operation.

By pressing on the body 1 and the clamp 9, they are brought together, and each longer plate 13 of the appliance enters the space between the other longer plate and the shorter plate 12. Each of the longer plates presses on its tape and forms in the space a definite reserve of the tape (FIG. 2). As a result, the branches of the tapes are tensioned, thereby unwinding a definite length of the tapes from the reel.

When the bringing of the body and the clamp together approaches an end the gripping element 10 directs both branches of the tapes towards the surface of the enclosure 5. When the body and the clamp are further brought together the heating elements are switched on automatically, the gripping element 10 presses on the enclosure 5, thereby compressing the springs thereof. As a result, the heating elements 3 and 4 are extended from the slots of the enclosure 5 and one of them, in this case, the inner heating element 4 simultaneously cuts off and welds the tapes, thereby forming two weld seams: one weld seam forms the loop which surrounds the plant and the wire, and the other weld seam joins the ends of the tapes passing out of the slots of the welding tip 2 and the gripping element 10. This operation completes the first stage of the plant tying-up.

Figure 3:
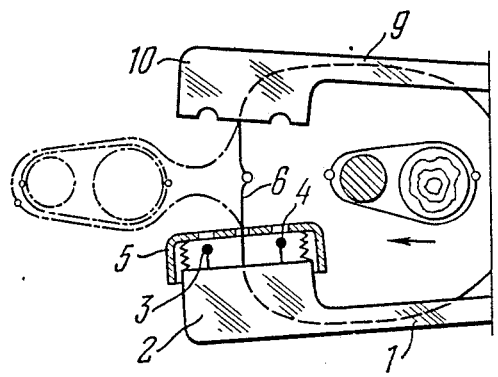

At a rapid opening of the appliance jaw enclosure 5 returns in the original position and the distance between the welding tip 2 and the gripping element 10 is overlapped by the tape with a still hot weld seam (FIG. 3). The break of this weld seam is prevented by that a length of the tape 6 required for overlapping the appliance jaw is unwound not from the reel 11 having a definite resistance to unwinding, but is made of the "zig-zag" portions of both branches of the tapes which at the opening of the appliance jaw are released of the pressure exerted by the appliance longer plates 13 and are in a free state.

Then the appliance with the overlapped jaw and the cooled weld seam is moved in reverse direction and the tape surrounds the initial loops with the plant and the wire outside the appliance jaw (illustrated by dot-and-dash contour in FIG. 3).

The tape is welded and cut by the external heating element 3 in a similar manner described hereinbefore. In this case two new weld seams are formed: one joins the ends of the second loop and the other one joins the ends of the tapes overlapping the distance between the welding tip and the gripping element of the appliance. At the end of this stage the appliance jaw may also be rapidly opened without any danger of breaking a still hot weld seam, as the overlapping of the appliance jaw is accomplished at the expense of a reserve of the tapes formed by the plate 12 and 13 of the appliance.

After the plant is tied up, the appliance jaw is overlapped by the tape and the appliance is ready for further operation, the operator goes over to a next plant and the cycle of tying-up is repeated.

Thus, the appliance of the invention is simple in design, manufacture, operation and servicing.

INDUSTRIAL APPLICATION

The design embodiment of the welding and tape advance elements described in the proposed invention and their relative position make it possible to reduce the expenditures of labour for tying-up by 2-3 times and to increase the shift productivity by 25-35% by providing the conditions for obtaining strength weld seams, excluding any possibility of weakening or breakage of a weld seam in case of a rapid opening of the appliance jaw after welding and for avoiding the need for a repeated welding of broken away ends of the tape. The absence of special mechanishms for fastening, feeding, holding and cutting the tape, and additional fastening elements contributes to reduction of the metal content and specific consumption of materials by 30-35% and the no-waste technology of tying-up improves the economic efficiency of the tying-up process.

What is claimed is:

1. An appliance for tying up plants, comprising:
    a body with a welding tip and heating elements;
    a clamp with a gripping element spring-loaded relatively to said body;
    a reel for a tape tying material;
    a device for a cyclic advance of the tape from said reel, made in the form of shorter plates and longer plates arranged in succession on said body and clamp, each of said plates being provided with a slot for passing said tape;
    said slots are arranged on the shorter plates at free ends thereof and on the longer plates, level with the slots arranged on the shorter plates.

2. An appliance as set forth in claim 1, wherein the reel is equidistant from the body welding tip and the clamp gripping element.

3. An appliance as set forth in claim 1, wherein the heating elements are contained in an enclosure spring-loaded relatively to the welding tip and provided with slots for passing the heating elements.

* * * * *